(12) United States Patent
Nagasawa (10) Patent No.: US 7,250,593 B2
(45) Date of Patent: Jul. 31, 2007

(54) MOBILE BODY SURROUNDING SURVEILLANCE APPARATUS, MOBILE BODY SURROUNDING SURVEILLANCE METHOD, CONTROL PROGRAM, AND READABLE RECORDING MEDIUM

(75) Inventor: Shunsuke Nagasawa, Kyoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 230 days.

(21) Appl. No.: 11/049,711

(22) Filed: Feb. 4, 2005

(65) Prior Publication Data
US 2005/0189471 A1 Sep. 1, 2005

(30) Foreign Application Priority Data
Feb. 6, 2004 (JP) ............................. 2004-031433

(51) Int. Cl.
*H01L 27/00* (2006.01)
(52) U.S. Cl. .................................. 250/208.1; 250/221
(58) Field of Classification Search ............. 250/208.1, 250/221, 201.1, 559.05; 340/435–438
See application file for complete search history.

(56) References Cited

U.S. PATENT DOCUMENTS 7,038,577 B2 * 5/2006 Pawlicki et al. ............ 340/435

FOREIGN PATENT DOCUMENTS

JP 2000-285245 A 10/2000

OTHER PUBLICATIONS

"Obstacle Detection Based on Motion Constraint of Virtual Planes," Proceedings of the 2002 IEEE/RSJ International Conference on Intelligent Robots and Systems (IROS 2002), Lausanne, Switzerland, Sep. 30-Oct. 4, 2002, IEEE/RSJ Internatioal Conference on Intelligent Robots and Systems, New York, NY IEEE, US, vol. 1 of 3, Sep. 30, 2002, p. 61-66.
Techmer A. et al, "a 100 GOPS Vision Platform for Intelligent Vehicles," Intelligent Vehicles Symposium, 2003, Proceedings, IEEE Jun. 9-11, 2003, Piscataway, NJ, USA, IEEE, Jun. 9, 2003, pp. 114-119.
Aoki M, "Imaging and Analysis of Traffic Scene," Image Processing, 1999, ICIP 99, Proceedings, 1999 International Conference on Kobe, Japan Oct. 24-28, 1999, Piscataway, NJ, USA, IEE, US, vol. 4, Oct. 24, 1999, pp. 1-5.

* cited by examiner

*Primary Examiner*—Que T. Le
(74) *Attorney, Agent, or Firm*—Birch, Stewart, Kolasch & Birch, LLP (57) ABSTRACT

A mobile body surrounding surveillance apparatus comprises an image capturing section for capturing an image of a surrounding of a mobile body, a setting section for setting a landscape, band-like particular region parallel to a frame image with respect to image data captured by the image capturing section, an extraction section for taking image data of the particular region every one or more frame images captured in time series by the image capturing section, and extracting movement vector information based on the image data of the particular region, and a detection section for detecting another mobile body present in the surrounding of the mobile body based on the movement vector information.

16 Claims, 8 Drawing Sheets

MOBILE BODY SURROUNDING SURVEILLANCE APPARATUS, MOBILE BODY SURROUNDING SURVEILLANCE METHOD, CONTROL PROGRAM, AND READABLE RECORDING MEDIUM

This non-provisional application claims priority under 35 U.S.C. §119(a) on Patent Application No. 2004-031433 filed in Japan on Feb. 6, 2004, the entire contents of which are hereby incorporated by reference.

BACKGROUND OF THE INVENTION

1. Field of the Invention

The present invention relates to a mobile body surrounding surveillance apparatus for surveillance of safety during movement of a manned or unmanned mobile body, such as a ship or a car (a vehicle, such as a two-wheeled vehicle (e.g., a motorcycle or a bicycle), a four-wheeled vehicle (e.g., an automobile), a train, etc.), a human or the like. For example, when a mobile body (own mobile body) moves laterally and there is a risk such that the mobile body contacts or collides with another mobile body (other mobile body) existing therearound, the mobile body surrounding surveillance apparatus is used to assist confirming the safety by warning a human involved with the mobile body by informing the danger caused by the approach of the other mobile body. The present invention also relates to a mobile body surrounding surveillance method using the mobile body surrounding surveillance apparatus, a control program for causing a computer to execute the mobile body surrounding surveillance method, and a computer-readable recording medium recording the control program.

2. Description of the Related Art

A recent increase in accidents of mobile bodies, such as traffic accidents (e.g., collision of automobiles, etc.) raises a significant public concern. Particularly, when moving an automobile to the left or right to make a lane change or turning right or left, a collision or crash frequently occurs in spite of the automobile driver's caution. The reason for such collision or crash is considered as follows: the automobile driver does not sufficiently confirm a rear and side direction with respect to the moving direction of his/her driving car (own mobile body) using a rearview mirror or the like; or there is another car (another mobile body) which is not covered by a rearview mirror or the like, i.e., a so-called blind spot.

To prevent such a traffic accident, for example, Japanese Laid-Open Publication No. 2000-285245 discloses a mobile body crash prevention apparatus which takes an image of a rear view using a camera mounted on a car, detects the presence of another car from the captured image, and employs an informing section to inform the driver of the car of the approach of another car by giving a warning, if there is a risk of collision or crash of another car coming in a rear and side direction when moving to the left or right (e.g., making a lane change, etc.) or turning left or right.

With the mobile body crash prevention apparatus, line edges which constitute a white line on a road or a ridge line of the road, and a vanishing point (point at infinity) which is an intersection of the line edges, are detected in each image of a plurality of frames captured in time series by the capturing section. Based on the white line and the ridge line and the positional information of the vanishing point, a detection region is narrowed. The detection region is divided into small regions (blocks). Movement amounts of the small regions between each frame are calculated by a technique called optical flow. In this case, the detection region is a region E which is about a half of a screen indicated by slanted dashed lines in FIG. 10. The movement amount information thus calculated is used to detect, for example, a passing car rapidly approaching from a rear and side direction.

However, the conventional mobile body crash prevention apparatus of Japanese Laid-Open Publication No. 2000-285245 has the following problem.

Figure 10:
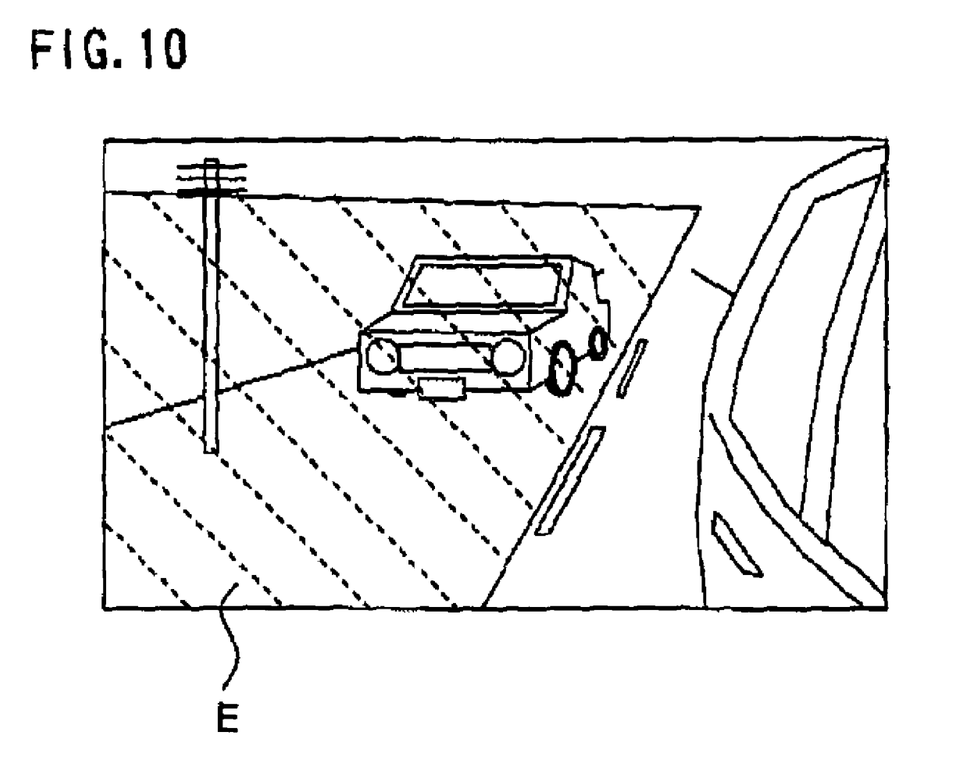
FIG. 10 is an image diagram schematically showing a conventional detection region.

When driving, a white line is detected to confirm a lane, a vanishing point is calculated to obtain the moving direction of another car, and optical flow is used to determine how each block obtained by dividing the detection region is moved. Thus, advanced computation is required. In addition to the computation quality, the computation amount is huge, because the large image region E which is about a half of a screen indicated by slanted dashed lines in FIG. 10 is required as a detection region.

Thus, real-time processing cannot be performed due to the huge computation amount. To reduce the computation amount, a method of predicting a movement amount associated with the passage of time is used, for example. Therefore, the movement direction of another oar cannot be correctly detected, likely leading to occurrence of error. Further, some roads may have no white lines, so that the movement amount of the mobile body cannot be calculated. Thus, the apparatus is not practical.

SUMMARY OF THE INVENTION

According to an aspect of the present invention, a mobile body surrounding surveillance apparatus comprises an image capturing section for capturing an image of a surrounding of a mobile body, a setting section for setting a landscape, band-like particular region parallel to a frame Image with respect to image data captured by the image capturing section, an extraction section for taking image data of the particular region every one or more frame images captured in time series by the image capturing section and extracting movement vector information based on the image data of the particular region, and a detection section for detecting another mobile body present in the surrounding of the mobile body based on the movement vector information.

In one embodiment of this invention, the image capturing section is attached to a position of the mobile body such that the image capturing section can capture an image in a rear and side direction.

In one embodiment of this invention, the setting section sets the particular region in the captured image data so that a captured image of the mobile body is not Included in the image data and at least a portion of a captured image of the other mobile body is included in the image data.

In one embodiment of this invention, the particular region is divided Into a plurality of regions, and the extraction section compares a sum value of current Image data with a sum value of previous image data time t (t>0) before for each divided region, extracts one of the divided regions of the previous image data having a minimum difference value between the sum values for each divided region of the current image data, and determines a position of the extracted divided region of the previous image data as a position of the divided region of the current image data time t before, and extracts a positional relationship of the extracted divided region of the previous image data and the divided region of the current image data as the movement vector information.

In one embodiment of this invention, the extraction section determines whether the position of the divided region of the current image data is shifted to the left or right of the position of the extracted divided region of the previous image data to determine the movement vector information.

In one embodiment of this invention, the detection section detects a relative movement state of the mobile body and the other mobile body based on the movement vector information.

In one embodiment of this invention, the detection section reads out the movement vector information for each divided region obtained by dividing the particular region into a plural number, and when an incremented value of a vector number in a predetermined direction of the read movement vector information is greater than a determination threshold, detects that there is the other mobile body approaching the mobile body.

In one embodiment of this invention, the detection section further comprises a change informing section for outputting a warning, depending on the relative movement state between the mobile body and the other mobile body.

In one embodiment of this invention, the mobile body surrounding surveillance apparatus further comprises a storage section for temporarily storing an extraction process result of the extraction section. The detection section reads out the movement vector information from the storage section to use the movement vector information for the detection process.

In one embodiment of this invention, the extraction section comprises a division section for dividing image data of the particular region which is a portion of image data of the captured frame image into a plurality of divided regions, a sum value calculation section for calculating a sum of image data values for each divided region, a divided region extraction section for extracting one of the divided regions of previous image data having a minimum difference in sum value between the previous image data and current image data, for each divided region of the current image data, a left/right determination section for determining whether the divided region of the current Image data which gives the minimum difference is located to the left or right of the extracted divided region of the previous image data, and a movement vector information determination section for determining the movement vector information as left movement vector information when the divided region of the current image data is located to the left and as right movement vector information when the divided region of the current image data is located to the right.

In one embodiment of this invention, the detection section further comprises a movement vector number calculation section for detecting whether the movement vector Information indicates "left" or "right" for each of all of the divided regions and incrementing a movement vector number when a specified one of "left" and "right" is indicated, and an other mobile body approaching determination section for determining that there is the other mobile body approaching the mobile body when an incremented value of the movement vector number exceeds a determination threshold.

In one embodiment of this invention, the setting section sets a plurality of particular regions with respect to the image data captured by the image capturing section, the plurality of particular regions having the same position in a horizontal direction and different positions in a vertical direction. The extraction section takes the image data of each particular region and extracts the movement vector information. The detection section increments the vector number when the movement vector information of each divided region in the plurality of particular regions having the same position in the horizontal direction and the different positions in the vertical direction. When a total of the incremented values of all of the divided regions is greater than a predetermined determination threshold, it is determined that there is the other mobile body approaching the mobile body.

According to another aspect of the present invention, a mobile body surrounding surveillance method, comprises causing an image capturing section to capture image data of a surrounding of a mobile body in time series as frame images, setting a landscape, band-like particular region parallel to the frame image every one or more of the captured frame images, taking image data of the particular region every one or more of the captured frame images and extracting movement vector information based on the image data of the particular region, and detecting another mobile body present in the surrounding of the mobile body based on the movement vector information.

In one embodiment of this invention, the extraction step comprises taking image data of the set particular region which is a portion of the captured frame image, dividing the particular region into a plurality of divided regions, calculating a sum of image data values for each divided region, storing the sum value of each divided region as current image data into a storage section, reading the sum value data as previous image data from the storage section for each divided region time t before, comparing the sum value of the current image data and the sum value of the previous image data and extracting one of the divided regions of the previous image data having a minimum difference in sum value between the previous image data and the current image data, for each divided region of the current image data, determining whether the divided region of the current image data which gives the minimum difference is located to the left or right of the extracted divided region of the previous image data, and determining the movement vector information as left movement vector information when the divided region of the current image data is located to the left and as right movement vector information when the divided region of the current image data is located to the right.

In one embodiment of this invention, the detection step further comprises detecting whether the movement vector information indicates "left" or "right" for each of all of the divided regions and incrementing a movement vector number when a specified one of "left" and "right" is indicated, and determining that there is the other mobile body approaching the mobile body when an incremented value of the movement vector number exceeds a determination threshold.

According to another aspect of the present invention, a control program is provided for causing a computer to execute the above-described mobile body surrounding surveillance method.

According to another aspect of the present invention, a computer-readable recording medium recording the above-described control program is provided.

Hereinafter, functions of the present invention will be described.

According to the present invention, movement vector information is extracted based on image data in a particular region between temporally adjacent frame images and another mobile body present in a surrounding (e.g., a rear and side direction) of an own mobile body can be detected based on the vector information. The detection range can be limited to a particular region. The present invention can be achieved without advanced computation, such as a technique of obtaining a vanishing point, a white line or the like, optical flow, or the like, which is conventionally required.

Therefore, it is possible to detect a relative movement state between the own mobile body and the other mobile body with a smaller amount of computation without advanced computation. Therefore, it is possible to produce a mobile body surrounding surveillance apparatus with low cost and without an expensive CPU having high-speed processing performance or the like. Thus, the computation amount is small and real-time (high-speed) computation can be achieved. Therefore, it is not necessary to calculate and predict a movement amount associated with the passage of time, thereby further improving detection accuracy.

The detection process is performed based on image data of each landscape, band-like particular region which is parallel to a frame image among a plurality of frame images, thereby simplifying computation. Therefore, it is possible to reduce errors due to noise or the like. Thus, the detection accuracy can be further improved. Furthermore, by setting a plurality of particular regions, it is possible to reduce erroneous detection or the like due to the size, shape or the like of another mobile body to be detected. Thus, the detection accuracy can be further improved.

According to the present invention, another mobile body present in, for example, a rear and side direction can be detected in a limited detection range of a particular region. The present invention can be achieved without advanced computation, such as a technique of obtaining a vanishing point, a white line or the like, optical flow, or the like, which is conventionally required. Therefore, the detection accuracy can be improved by real-time (high speed) computation with a smaller computation amount.

A surrounding of an own mobile body is monitored using an image capturing section (e.g., a camera, etc.) to check whether or not there is another mobile body in a moving direction (e.g., a rear and side direction, etc.) when moving the own mobile body to the left or right or turning left or right. When there is a risk of crash, a warning is given to the driver. Therefore, the present invention is useful for prevention of a crash due to an error in confirmation (e.g., visual confirmation, etc.).

Thus, the invention described herein makes possible the advantages of providing a mobile body surrounding surveillance apparatus capable of detecting another mobile body around an own mobile body in real time and with high accuracy and without advanced computation which is conventionally required; a mobile body surrounding surveillance method using the mobile body surrounding surveillance apparatus; a control program for causing a computer to execute the mobile body surrounding surveillance method; and a computer-readable recording medium recording the control program.

These and other advantages of the present invention will become apparent to those skilled in the art upon reading and understanding the following detailed description with reference to the accompanying FIGS.

DESCRIPTION OF THE PREFERRED EMBODIMENTS

Hereinafter, a mobile body surrounding surveillance apparatus according to the present invention and a mobile body surrounding surveillance method using the same will be described by way of embodiments with reference to the accompanying drawings, where they are applied to an automobile. In the following description, an automobile is described as an example of a mobile body. The present invention is not limited to automobiles and can be applied to a manned or unmanned mobile body, such as a ship or a car (a vehicle, such as a two-wheeled vehicle (e.g., a motorcycle or a bicycle), a four-wheeled vehicle (e.g., an automobile), a train, etc.), a human or the like.

Figure 1:
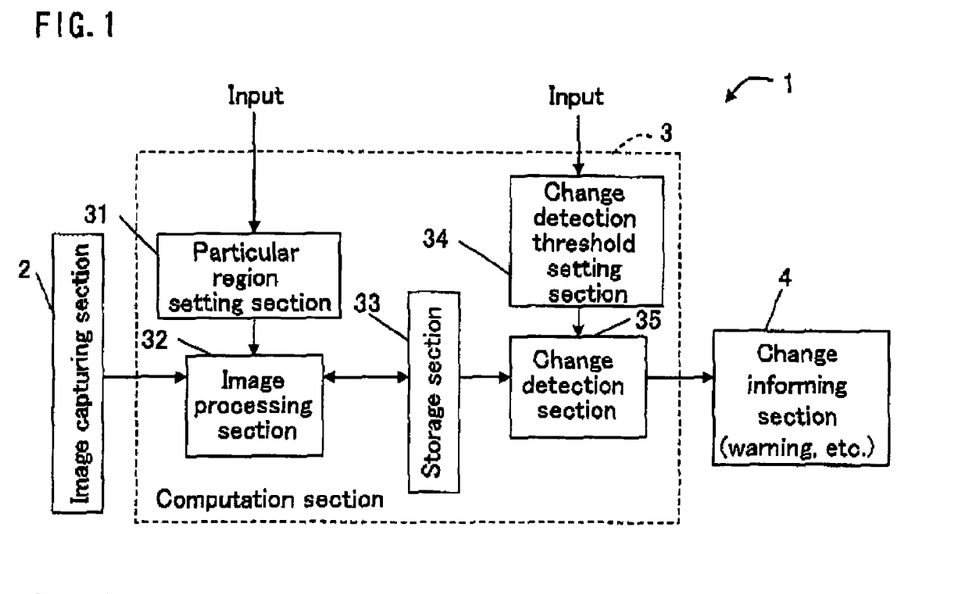
FIG. 1 is a block diagram showing a structure of a mobile body surrounding surveillance apparatus according to an embodiment of the present invention.

FIG. 1 is a block diagram showing a structure of a mobile body surrounding surveillance apparatus according to an embodiment of the present invention.

Figure 2:
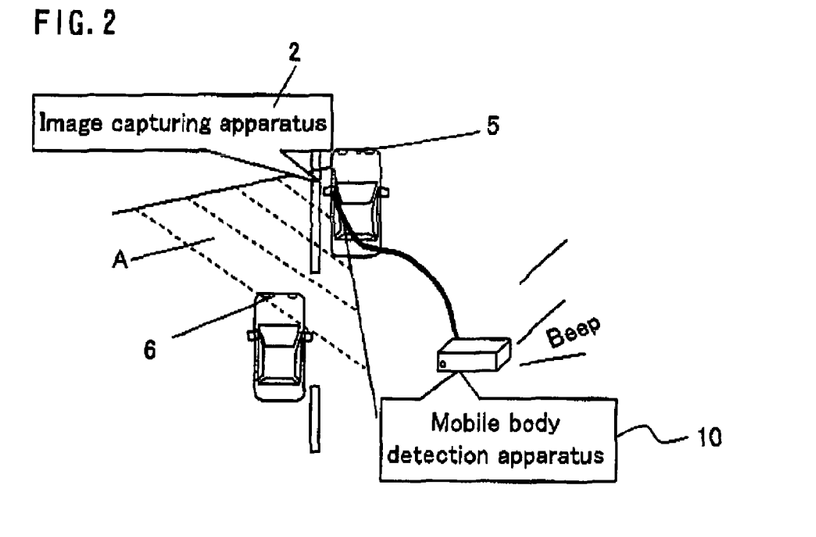
FIG. 2 is a top view schematically showing the mobile body surrounding surveillance apparatus of FIG. 1 which is attached to an automobile and its vicinity.

FIG. 2 is a top view schematically showing the mobile body surrounding surveillance apparatus of FIG. 1 which is attached to an automobile and its vicinity.

As shown in FIG. 1, the mobile body surrounding surveillance apparatus 1 of the embodiment of the present invention comprises an image capturing section 2 for capturing an image of a surrounding of an automobile, a computation section 3 for executing a warning detection computation based on the captured image of a surrounding of an automobile to detect a risk due to the approach of another mobile body (described in detail elsewhere below), and a change informing section 4 for giving a warning to a relevant person (driver) in accordance with warning detection information from the computation section 3.

The image capturing section 2 is a camera, such as an analog output camera, a digital output camera or the like. The image capturing section 2 is used to capture an image of a surrounding of an automobile. In FIG. 2, the image capturing section 2 is attached as an image capturing apparatus to an own mobile body 5 at a position (a top or bottom portion of a rearview mirror) which enables the image capturing apparatus to capture a rear and side view. The image capturing section 2 captures an image of a rear and side range which is a captured image region A indicated by slanted dashed lines in FIG. 2. Another mobile body 6 indicates another automobile which approaches the own mobile body 5 from a left and rear direction. When the image capturing section 2 is an analog output camera, an analog image signal is converted into a digital image signal by an A/D converter (not shown) before the image data is input to the computation section 3.

The computation section 3 comprises a particular region setting section 31 (setting section), an image processing section 32 (extraction section), a storage section 33, a change detection threshold setting section 34, and a change detection section 35 (detection section). The computation section 3 detects the other mobile body 6 which is present in the vicinity of the own mobile body 5 from the Image data captured by the image capturing section 2.

The particular region setting section 31 sets a particular region which is sufficiently small with respect to the image captured by the image capturing section 2. The particular region is a region (detection region) in which the image processing section 32 and the change detection section 35 detect the other mobile body 6 which is present in the vicinity of the own mobile body 5. A relative movement state (distance) between the own mobile body 5 and the other mobile body 6 varies. The particular region is defined as a rectangular (band-like, landscape (having a width greater than length)) region which is horizontally parallel to a frame image, with respect to the image captured by the image capturing section 2. Thus, the reason why such a particular region is provided is that the computation amount is significantly reduced, thereby making it possible to achieve real-time and effective computation.

From the image capturing section 2, the image processing section 32 receives image data of the particular region set by the particular region setting section 31 for each of a plurality of frame images captured in time series by the image capturing section 2. The image processing section 32 extracts movement vector information based on the received image data of the particular region by an extraction process described is elsewhere below. The extraction process of the movement vector information will be described in detail with reference to FIG. 6 elsewhere below.

Figure 3:
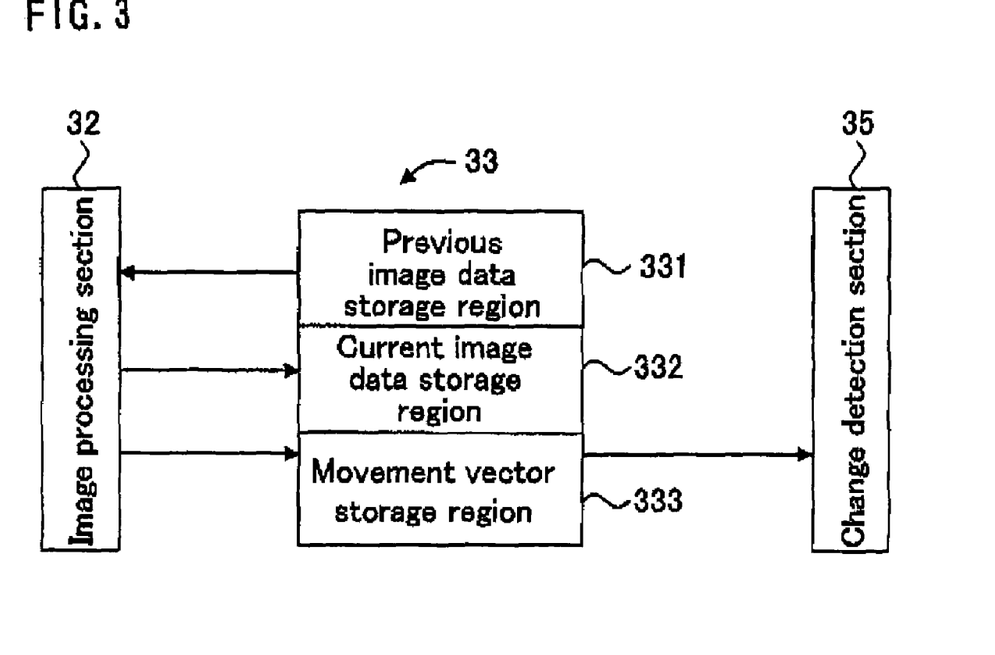
FIG. 3 is a block diagram showing an exemplary memory structure of a storage section of FIG. 1.

The storage section 33 temporarily stores a result of the extraction process by the image processing section 32. The storage section 33 has a memory structure as shown in FIG. 3. Specifically, the storage section 33 has a previous image data storage region 331, a current image data storage region 332 and a movement vector storage region 333. Among them, the previous image data storage region 331 and the current image data storage region 332 are switched on a frame-by-frame basis by switching the memory address.

The change detection threshold setting section 34 sets a change detection threshold so as to determine the relative movement state between the own mobile body 5 and the other mobile body 6.

The change detection section 35 detects the other mobile body 6 which is present in the vicinity of the own mobile body 5 based on the movement vector information which is extracted by the image processing section 32 and is stored by the storage section 33, using a process described elsewhere below. The change detection section 35 further determines whether or not the relative movement state (distance) between the own mobile body 5 and the other mobile body 6 is dangerous, based on the determination threshold set by the change detection threshold setting section 34. When the relative movement state (distance) between the own mobile body 5 and the other mobile body 6 exceeds the determination threshold, the change detection section outputs warning detection information as a result of determination by the change detection section 35 to the change informing section 4. The detection process of the relative movement state between the own mobile body 5 and the other mobile body 6 will be described in detail with reference to FIG. 7 elsewhere below.

The change informing section 4 informs a driver of the own mobile body 5 of a danger by generating a warning sound or displaying a warning based on the relative movement state between the own mobile body 5 and the other mobile body 6 which is detected by the change detection section 35, such as, for example, warning detection information which is output when the other mobile body 6 is very close to the own mobile body 5 so that there is a risk of a crash (when the relative movement state exceeds the determination threshold).

The computation section 3 and the change informing section 4 are packaged into a single mobile body detection apparatus 10 of FIG. 2 and are accommodated in a front portion of a driver seat in an automobile. Therefore, it is possible for the driver to easily confirm a warning (a sound or a display).

Hereinafter, a mobile body surrounding surveillance method using the mobile body surrounding surveillance apparatus 1 of the embodiment thus constructed will be described.

Figure 4A:
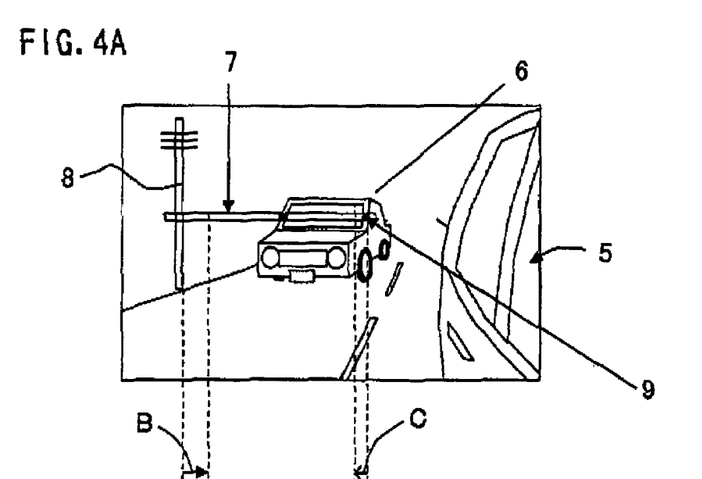
FIG. 4A is an image diagram schematically showing a captured surrounding image of an own mobile body captured by an image capturing section of FIG. 1.
Figure 4B:
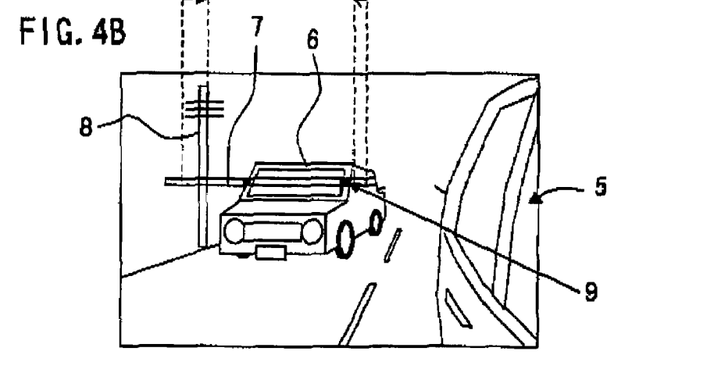
FIG. 4B is an image diagram schematically showing a captured surrounding image of the own mobile body captured by the image capturing section time t after FIG. 4A.

FIG. 4A is an image diagram schematically showing a captured surrounding image of the own mobile body 5 captured by the image capturing section 2 of FIG. 1. FIG. 4B is an image diagram schematically showing a captured surrounding image of the own mobile body 5 captured by the image capturing section 2 time t (frame time; a time between temporally adjacent frames) after FIG. 4A.

As shown in FIGS. 4A and 4B, the image capturing section 2 captures a view in a rear and side direction from the own mobile body 5. It is shown that the other mobile body 6 is approaching the own mobile body 5 from the rear and side direction.

A particular region 7 is a region for checking a changed state of a captured image set by the particular region setting section 31. The particular region 7 is a rectangular (band-like, landscape) region which is horizontally parallel to a frame image, with respect to the image captured by the image capturing section 2. The particular region 7 does not contain a captured image of the own mobile body 5 and contains at least a portion of a captured image of the other mobile body 6.

Figure 5A:
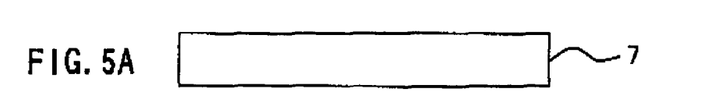
FIGS. 5A to 5D are diagrams showing other exemplary rectangular shapes of the particular region of FIG. 4A and other exemplary shapes of the particular region.
Figure 5B:
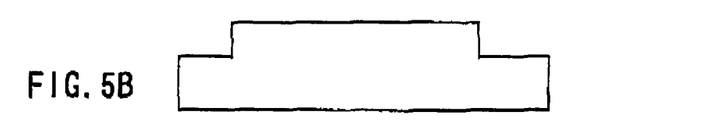
Figure 5C:
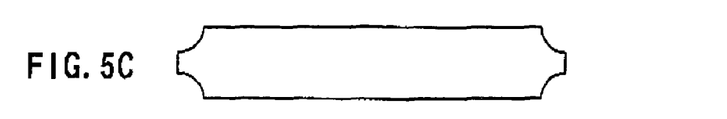
Figure 5D:
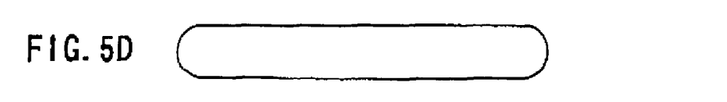

The particular region 7 is processed by the image processing section 32 and the change detection section 35 to detect the relative movement state (distance) between the other mobile body 6 and the own mobile body S. The shape of the particular region 7 is not limited to a regular landscape rectangle as shown in FIG. 6A and may have various shapes deformed from the rectangle of FIG. 5A as shown in FIGS. 5B to 5D, depending on the size or shape of the other mobile body 6 to be detected.

In FIGS. 4A and 4B, an object which is located at a side of a road and does not move, such as a utility pole 8 or the like, is shifted in aright direction indicated by arrow B in the captured image after time t. In contrast, an object which approaches the own mobile body 5 from a rear and side direction, such as the other mobile body 6 or the like, is shifted in a left direction indicated by arrow C in the captured image after time t as indicated by a position 9 of a left edge of the other mobile body 6 (a right edge in FIGS.

4A and 4B). Therefore, the object (the other mobile body 6) approaching the own mobile body 5 and the fixed (static) object (the utility pole 8) have opposite (different) moving directions (movement vectors) in the particular region 7. Thus, by using such movement vectors, the relative movement state (positional relationship; distance) between the own mobile body 5 and the other mobile body 6 can be accurately detected to detect the other mobile body 6 approaching the own mobile body 5, without using advanced computation, such as optical flow or the like, to calculate a vanishing point, a white line or the like.

Next, an exemplary process for extracting movement vector information using the image processing section 32 of FIG. 1 will be described in detail with reference to FIG. 6.

Figure 6:
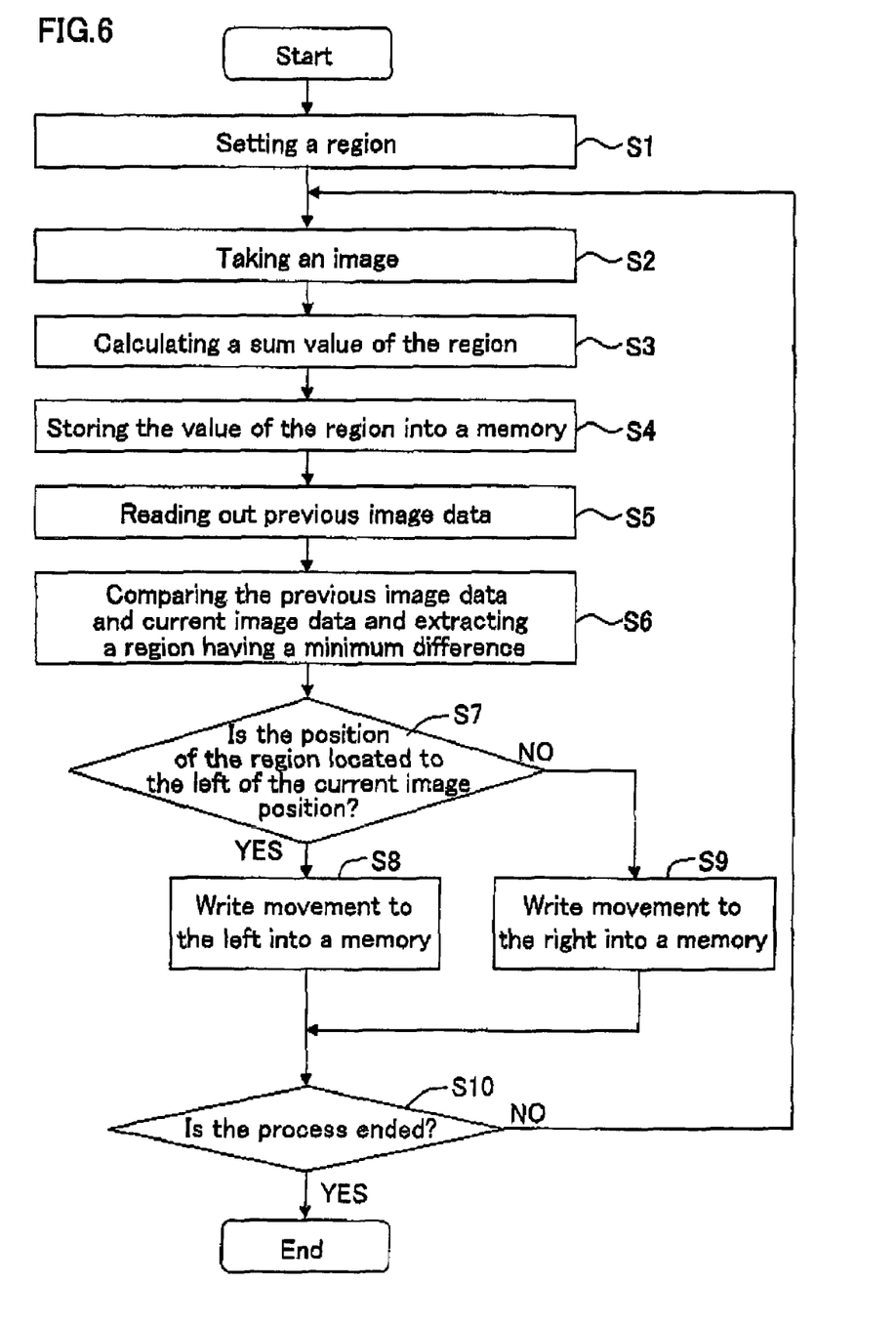
FIG. 6 is a flowchart for explaining an exemplary process of extracting movement vector information by an image processing section of FIG. 1.

FIG. 6 is a flowchart for explaining the process for extracting movement vector information using the image processing section 32 of FIG. 1.

As shown in FIG. 6, in step S1, the particular region setting section 31 sets the particular region 7 with respect to an image captured by the image capturing section 2. As shown in FIGS. 4A and 4B, the particular region 7 is a rectangular (landscape) region which is horizontally parallel to a frame image. A lateral position of the particular region 7 is set so that the captured image of the own mobile body 5 is not included and at least a portion of the captured image of the other mobile body 6 is included.

In step S2, image data corresponding to the particular region 7 is taken by the image processing section 32 from image data captured by the image capturing section 2.

In step S3, in order to obtain a movement vector in the particular region 7, the particular region 7 is divided into a plurality of regions, and a sum of image data values is calculated for each divided region. As the image data value to be summed, for example, a brightness signal can be used. Alternatively, any one or all of color signals (R, G, B, Y, U and V) may be used. The number of divisions of the particular region 7 may be increased, depending on the computation ability of the image processing section 32. Particularly, the size of each divided region is desirably 8×8 pixels or more In order to prevent erroneous detection due to noise or the like.

In step S4, the sum value of each divided region is stored in a corresponding divided region of the current image data storage region 332 in the storage section 33 (FIG. 3).

In step S5, the sum value data which has been stored in each divided region of the storage section 33 time t before, is read out from the previous image data storage region 331 of the storage section 33 of FIG. 3.

In step S6, current image data and previous image data are compared with each other so as to extract a divided region of the previous image data which has a minimum difference in sum value between the current image data and the previous image data, for each divided region of the current image data. The extracted divided region of the previous image data which has a minimum difference in sum value between the current image data and the previous image data, is considered to be a location at which the divided region of interest of the current image data was present time t before. Although an image captured time t before is the previous image in this embodiment, several images may be captured for time t.

In step S7, it is determined whether a positional relationship of the region extracted in step S6 between the previous image and the current image indicates "left" or "right". When the position of the extracted region in the previous image is left with respect to the position of the extracted region in the current Image ("YES" in step S7), the process goes to step S8. When the position of the extracted region in the previous image is right with respect to the position of the extracted region in the current image ("NO" in step S7), the process goes to step S9.

In step S8, movement to the left is stored in the movement vector storage region 333 of the storage section 33 of FIG. 3 for individual divided regions.

In step S9, movement to the right is stored in the movement vector storage region 333 of the storage section 33 of FIG. 3 for individual divided regions.

As described with reference to FIGS. 4A and 4B, the movement to the left indicates an object or the like (the other mobile body 6) approaching the own mobile body 5, while the movement to the right indicates an object or the like (the utility pole 8) which goes away from the own mobile body 5 or is fixed and does not move. Only left and right vector directions are extracted as movement vector information in this embodiment. In addition, if using a movement vector amount, a relative speed of the other mobile body 6 and the own mobile body 5 can be obtained.

In step S10, it is determined whether or not an instruction to end the process is input by the driver. Steps S2 to S9 are successively repeated until the process end instruction is input by the driver. When the process end instruction is input by the driver (YES), the process is ended.

Next, the process of detecting the relative movement state between the own mobile body 5 and the other mobile body 6 by the change detection section 35 will be described in detail with reference to FIG. 7.

Figure 7:
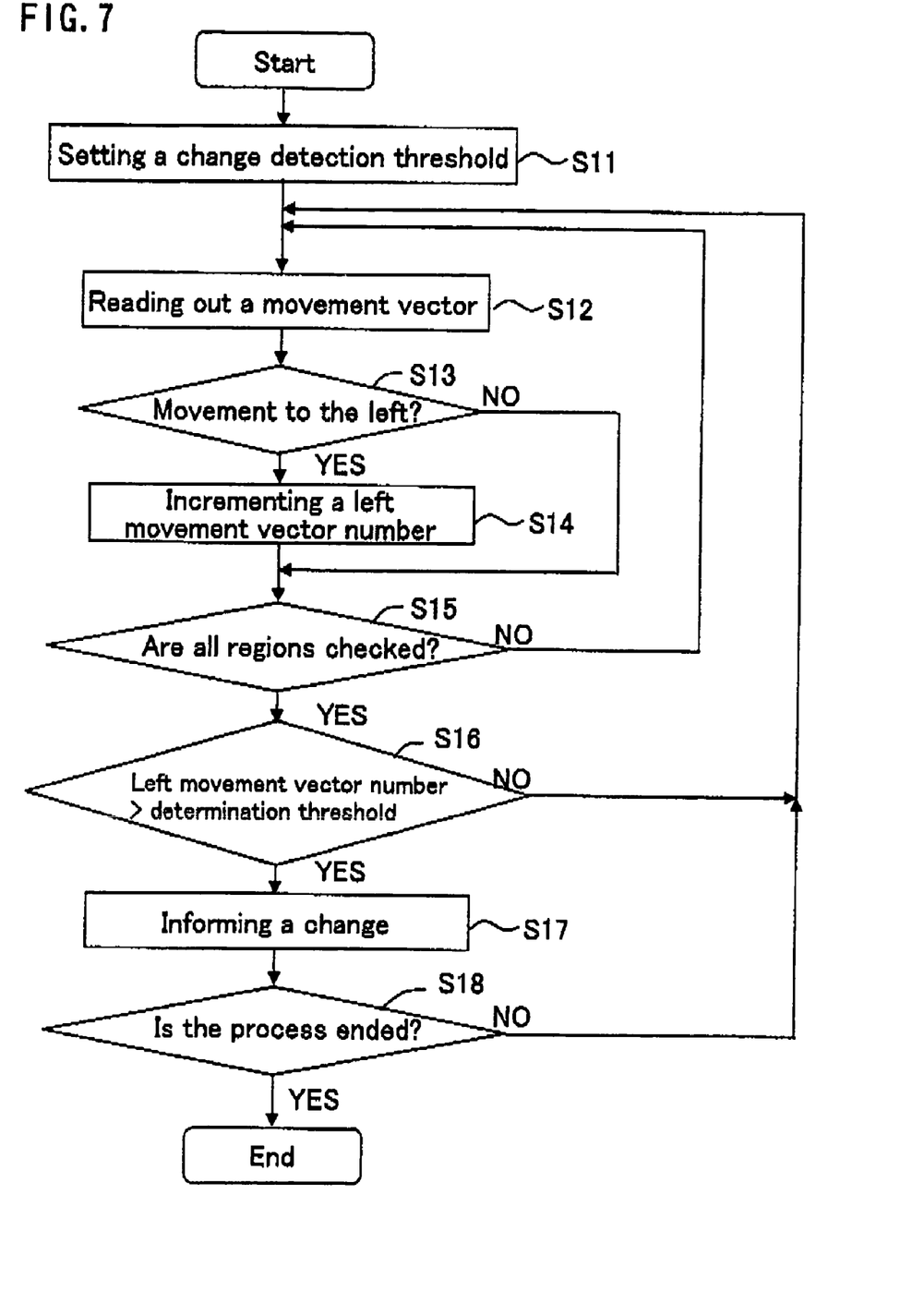
FIG. 7 is a flowchart for explaining an exemplary process of detecting a relative movement state between an own mobile body and another mobile body by a change detection section of FIG. 1.

FIG. 7 is a flowchart for explaining an example of the process of detecting the relative movement state between the own mobile body 5 and the other mobile body 6 by the change detection section 35 of FIG. 1.

As shown in FIG. 7, in step S11, a change detection threshold (determination threshold) is set in the change detection threshold setting section 34. The change detection threshold is previously determined based on the size and position of the other mobile body 6. Typically, the change detection threshold is preferably set, based on the size and distance of the other mobile body 6, to be about a half of the number of divided regions.

In step S12, the image processing section 32 is used to read out the movement vector information stored in the movement vector storage region 333 of the storage section 33 to the change detection section 35.

In step S13, it is determined whether the movement vector information thus read out indicates "left" or "right". When the movement vector information indicates "left" ("YES" in step S13), the process goes to step S14. In step S14, a left movement vector number (the number of left movement vectors) is incremented. When the movement vector information indicates "right" ("NO" in step S13), the process goes to step S15.

In step S15, steps S12 to S14 are repeated until all divided regions are processed. As a result, a left movement vector number from time t before to the current time (the incremented value of the left movement vector number) is calculated. In this embodiment, the left movement vector number is calculated. Conversely, when the image capturing section 2 is be placed on a left side of the own mobile body 5, a movement vector having a right direction indicates the approach of the own mobile body 5 and the other mobile body 6. In this case, aright movement vector number (the number of right movement vectors) is calculated.

In step S16, when the left movement vector number (incremented value) thus calculated is greater than the threshold set in step S11, it is determined that there is the other mobile body 6 approaching the own mobile body 5.

In step S17, the change informing section 4 is used to inform the driver of the own mobile body 5 of a risk due to the approach of the other mobile body 6 via a warning sound, a warning display or the like to draw the driver's attention to the risk. In this embodiment, when the other mobile body 6 approaching the own mobile body 5 has a risk of crash or the like, a warning sound or a warning display is output. Alternatively, a warning sound or a warning display may be output when the other mobile body 6 approaches the own mobile body 5 but is considered to be safe. Warning may be given via vibration, heat or the like in addition to a sound or a display (e.g., an image light, etc.). With such a warning, the driver can become aware of a risk of collision or crash of the own mobile body 5 and the other mobile body 6, and therefore, can avoid collision, crash or the like of the cars. Also in this embodiment, the change (warning) is given to the driver of the own mobile body 5. Alternatively, the change (warning) may also be given to the driver of the other mobile body 6, or alternatively, others who are present outside (around) the mobile bodies.

In step S18, it is determined whether or not the process end instruction is input by the driver. Steps S12 to S17 are successively repeated until the process end instruction is input by the driver. When the process end instruction is input by the driver (YES), the process is ended.

As described above, according to the mobile body surrounding surveillance apparatus 1 of this embodiment and the method using the mobile body surrounding surveillance method, the particular region setting section 31 is used to set the rectangular (landscape) particular region 7 which is parallel to the horizontal direction of a frame image, with respect to image data captured by the image capturing section 2. The image processing section 32 is used to take Image data of the particular region 7 for each of a plurality of frame images and extract a movement vector from the image data. Further, when a sum value of vector values in a predetermined direction (in movement vector information) exceeds the threshold set by the change detection threshold setting section 34, the change detection section 35 determines that the other mobile body 6 is close to the own mobile body 5 to a dangerous level and the change informing section 4 is used to inform the driver of the risk via a warning sound, a warning display or the like to draw the driver's attention. Thus, the other mobile body 6 present in a surrounding of the own mobile body 5 can be accurately and reliably detected in real time without advanced computation or a large computation amount which are required for conventional techniques. Therefore, when there is a risk of collision, crash or the like, it is possible to give a warning to the driver to avoid the risk.

Figure 8A:
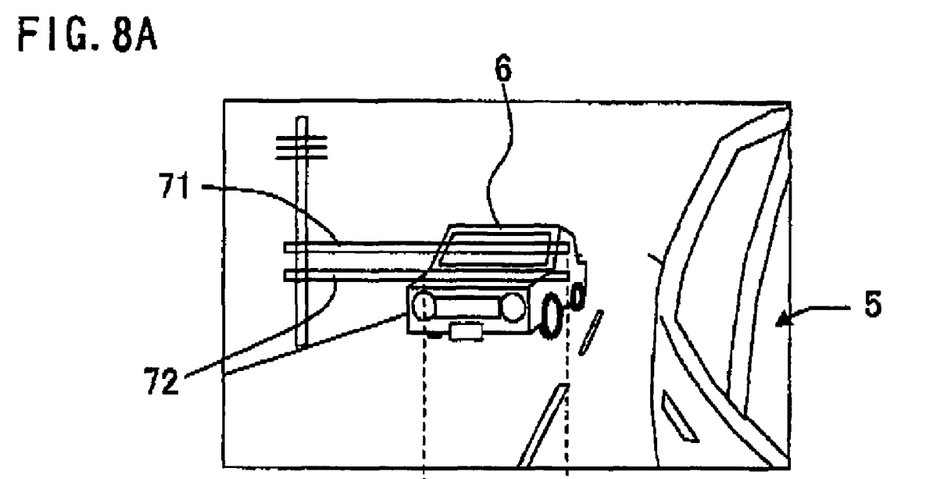
FIG. 8A is an image diagram schematically showing an exemplary captured image when a plurality of particular regions are provided.
Figure 8B:
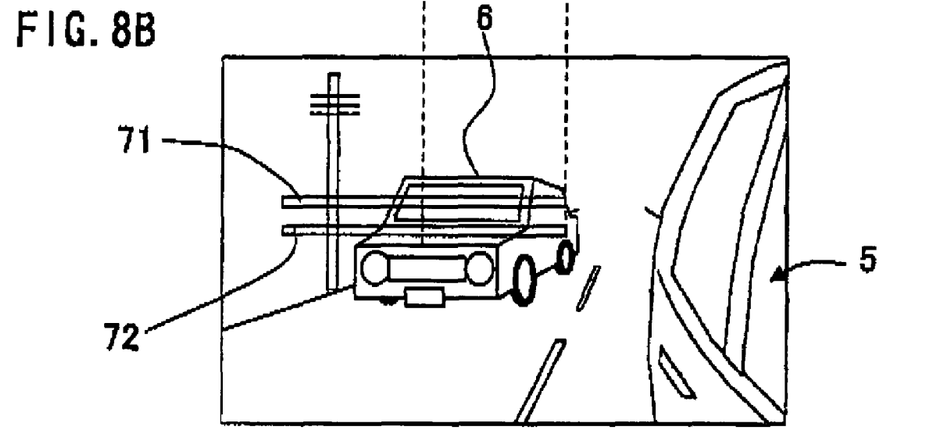
FIG. 8B is an image diagram showing the image time t after.

In this embodiment, the particular region 7 is a single landscape image region which is parallel to the horizontal direction of the image plane, and does not contain the captured image of the own mobile body 5 and contains at least a portion of the captured image of the other mobile body 6. The present invention is not limited to this. As shown in FIGS. 8A and 8B, there may be two particular regions 71 and 72 which are landscape image regions parallel to each other under the above-described conditions. In the example of FIGS. 10A and 8B, the two particular regions 71 and 72 are disposed vertically. Alternatively, a larger number of particular regions may be provided. The sizes (widths or lengths), shapes and positions of the particular regions 7, 71 and 72 can be changed, depending on the shape or condition of a mobile body, such as an automobile or the like.

When a plurality of particular regions 7 are provided, each particular region (e.g., 71, 72) is subjected to the movement vector information extraction process shown in the flowchart of FIG. 6 and the process of detecting the relative movement state between the own mobile body 5 and the other mobile body 6 shown in the flowchart of FIG. 7.

However, as shown in FIGS. 8A and 8B, the two particular regions 71 and 72 are shifted from each other only in a vertical direction and are parallel to each other. In this case, even when the other mobile body 6 moving relative to the own mobile body 5 changes its vertical position, the two particular regions 71 and 72 provide movement vectors having the same directions. Therefore, as shown in a flowchart of FIG. 9, when two divided regions which have the same horizontal position and different vertical positions have movement vectors having the same direction, it is determined that there is a change in the relative movement state between the own mobile body 5 and the other mobile body 6 (an improvement in detection accuracy). A method of incrementing a movement vector number is preferably used. Hereinafter, steps in FIG. 9 will be described.

Figure 9:
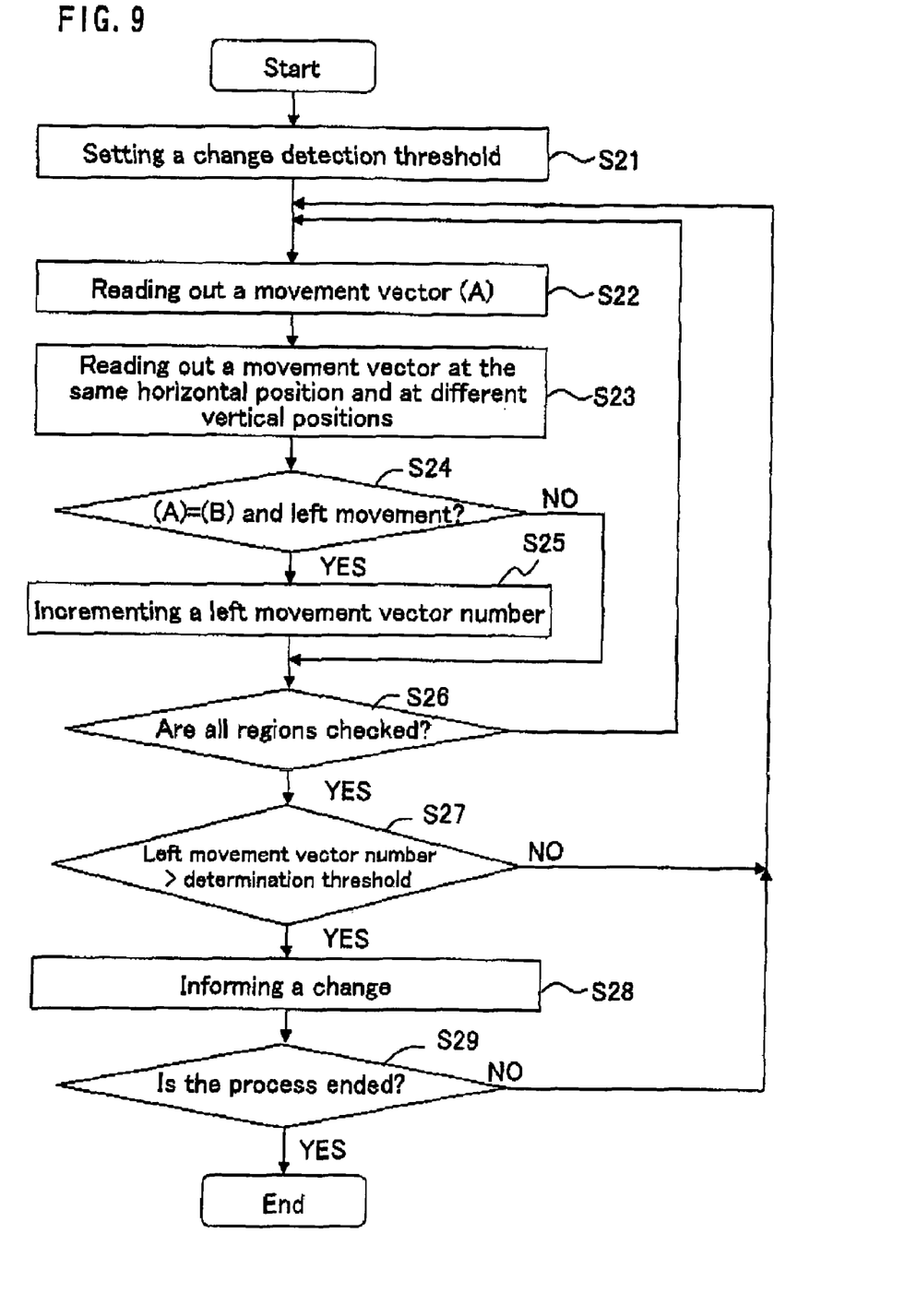
FIG. 9 is a flowchart for explaining an exemplary process of detecting a change using a change detection section of FIG. 1 where a plurality of particular regions are provided as in FIGS. 8A and 8B.

FIG. 9 is a flowchart for explaining an exemplary change detection process using the change detection section 35 of FIG. 1 where a plurality of particular regions are provided as In FIGS. 8A and 8B.

As in FIG. 9, in step S21, the change detection threshold setting section 34 sets a change detection threshold (a determination threshold). The change detection threshold is previously determined based on the size, position or the like of the other mobile body 6 by the change detection threshold setting section 34. In this case, it is preferable that the threshold is set to be slightly smaller than when only one particular region is provided (the particular region 7 in FIG. 4A).

In step S22, for one particular region (e.g. the particular region 71 of FIGS. 8A and 5B), the image processing section 32 is used to read movement vector information (A) which has been written into the movement vector storage region 333 of the storage section 33, to the change detection section 35.

In step S23, for a second particular region (e.g., the particular region 72 in FIGS. 8A and 83), the image processing section 32 is used to read movement vector information (B) which has been written into the movement vector storage region 333 of the storage section 33, to the change detection section 35, with respect to a divided region which has the same horizontal position as that of a divided region read out in step S22 and has a different vertical position.

In step 624, it is determined whether or not the movement vector information A and B read out in step S22 and step S23 matches each other (A-B) and there is movement in a left direction (indicating the approach of the own mobile body 5 and the other mobile body 6). When the movement vector information A and B match each other and there is movement in a left direction ("YES" in step S24), the process goes to step S25. When the movement vector information A and B do not match each other, or otherwise but there is movement to a right direction ("NO" in step S24), the process goes to step S26.

In step S25, a left movement vector number is incremented. Thus, by incrementing the left movement vector number only when movement vectors match each other, correct determination can be achieved no matter that a vector direction is erroneously detected due to noise or light reflection.

In step S26, steps S22 to S25 are repeated until all divided regions are processed. As a result, the left movement vector number from time t before to the current time is calculated (the incremented value of the left movement vector number).

In step S27, when the left movement vector number (incremented value) thus calculated exceeds the threshold set in step S21, it is determined that there is the other mobile body 6 approaching the own mobile body 5.

In step S28, a warning is given to the driver of the own mobile body 5 via a warning sound, a warning display or the like by the change informing section 4 to draw the driver's attention.

Thus, by providing a plurality of particular regions on a display screen, erroneous detection due to the size or shape of the other mobile body 6 to be detected can be reduced, resulting in a further improvement in detection accuracy.

In step S29, it is determined whether or not a process end instruction is input by the driver. Steps S22 to S28 are successively repeated until the process end instruction is input by the driver. When the process end instruction is input by the driver (YES), the process is ended.

Though not described in the above-described embodiments, the present invention can be constructed by software. In this case, the computation section 3 of FIG. 1 is accommodated in a controller which controls the whole apparatus (control section having a CPU). A control program and its data for causing a computer to execute the steps of the flowcharts of FIGS. 6, 7 and 9 are stored in a storage device (not shown), such as a hard disk (computer-readable recording medium) in the controller or the like. The control program and its data can be read out from the storage to a work memory in the controller and can be executed.

Examples of the computer-readable recording medium include various IC memories, optical discs (e.g., CD, etc.), magnetic recording media (e.g., FD, etc.) and the like in addition to a hard disk. The control program and its data thus read out are stored in a RAM (work memory) in the controller and are executed by the CPU (control section) in the controller.

Functions of a detection section and an extraction section of the control section (CPU) will be described. The extraction section of the control section comprises: a division section (not shown) for dividing image data of a particular region which is a portion of image data of a captured frame image into a plurality of divided regions; a sum value calculation section (not shown) for calculating a sum of image data values for each divided region; a divided region extraction section (not shown) for extracting a divided region of previous image data having a minimum difference in sum value between the previous image data and current image data, for each divided region of the current image data; a left/right determination section (not shown) for determining whether the divided region of the current image data which gives the minimum difference is located to the left or right of the extracted divided region of the previous image data; and a movement vector information determination section (not shown) for determining movement vector information as left movement vector information when the divided region of the current image data is located to the left and as right movement vector information when the divided region of the current image data is located to the right. These functions are executed based on the control program.

The detection section further comprises: a movement vector number calculation section (not shown) for detecting whether the movement vector information indicates "left" or "right" for each of all divided regions and incrementing a movement vector number when a specified one of "left" and "right" is indicated; and an other mobile body approaching determination section (not shown) for determining that there is another mobile body approaching an own mobile body when the incremented value of the movement vector number exceeds the determination threshold. These functions are executed based on the control program.

As described above, the present invention provides a mobile body surrounding surveillance apparatus for surveillance of safety during movement of a manned or unmanned mobile body, such as a ship or a car (a vehicle, such as a two-wheeled vehicle (e.g., a motorcycle or a bicycle), a four-wheeled vehicle (e.g., an automobile), a train, etc.), a human or the like. For example, when a mobile body (own mobile body) moves laterally and there is a risk such that the mobile body contacts or collides with another mobile body (other mobile body) existing therearound, the mobile body surrounding surveillance apparatus is used to assist confirming the safety by warning a human involved with the mobile body by informing the danger caused by the approach of the other mobile body. The present invention also relates to a mobile body surrounding surveillance method using the mobile body surrounding surveillance apparatus, a control program for causing a computer to execute the mobile body surrounding surveillance method, and a computer-readable recording medium recording the control program. According to the present invention, the other mobile body present in the vicinity of the own mobile body can be accurately detected in real time (with high speed) without advanced computation or a large computation amount to inform a driver of a risk of collision, crash or the like. Therefore, the present invention is widely useful for a car safety system, a traffic system or the like and can prevent traffic accidents, such as a crash and the like.

Although certain preferred embodiments have been described herein, it is not intended that such embodiments be construed as limitations on the scope of the invention except as set forth in the appended claims. Various other modifications and equivalents will be apparent to and can be readily made by those skilled in the art, after reading the description herein, without departing from the scope and spirit of this invention. All patents, published patent applications and publications cited herein are Incorporated by reference as if set forth fully herein.

What is claimed is:

1. A mobile body surrounding surveillance apparatus, comprising:
    an image capturing section for capturing an image of a surrounding of a mobile body;
    a setting section for setting a landscape, band-like particular region parallel to a frame image with respect to image data captured by the image capturing section;
    an extraction section for taking image data of the particular region every one or more frame images captured in time series by the image capturing section and extracting movement vector information based on the image data of the particular region; and
    a detection section for detecting another mobile body present in the surrounding of the mobile body based on the movement vector information.

2. A mobile body surrounding surveillance apparatus according to claim 1, wherein the image capturing section is attached to a position of the mobile body such that the image capturing section can capture an image in a rear and side direction.

3. A mobile body surrounding surveillance apparatus according to claim 1, wherein the setting section sets the particular region in the captured image data so that a captured image of the mobile body is not included in the image data and at least a portion of a captured image of the other mobile body is included in the image data.

4. A mobile body surrounding surveillance apparatus according to claim 1, wherein the particular region is divided into a plurality of regions, and the extraction section compares a sum value of current image data with a sum value of previous image data time t (t>0) before for each divided region, extracts one of the divided regions of the previous image data having a minimum difference value between the sum values for each divided region of the current image data, and determines a position of the extracted divided region of the previous image data as a position of the divided region of the current image data time t before, and extracts a positional relationship of the extracted divided region of the previous image data and the divided region of the current image data as the movement vector information.

5. A mobile body surrounding surveillance apparatus according to claim 4, wherein the extraction section determines whether the position of the divided region of the current image data is shifted to the left or right of the position of the extracted divided region of the previous image data to determine the movement vector information.

6. A mobile body surrounding surveillance apparatus according to claim 1, wherein the detection section detects a relative movement state of the mobile body and the other mobile body based on the movement vector information.

7. A mobile body surrounding surveillance apparatus according to claim 1, wherein the detection section reads out the movement vector information for each divided region obtained by dividing the particular region into a plural number, and when an incremented value of a vector number in a predetermined direction of the read movement vector information is greater than a determination threshold, detects that there is the other mobile body approaching the mobile body.

8. A mobile body surrounding surveillance apparatus according to claim 6, wherein the detection section further comprises a change informing section for outputting a warning, depending on the relative movement state between the mobile body and the other mobile body.

9. A mobile body surrounding surveillance apparatus according to claim 1, further comprising:
a storage section for temporarily storing an extraction process result of the extraction section,
wherein the detection section reads out the movement vector information from the storage section to use the movement vector information for the detection process.

10. A mobile body surrounding surveillance apparatus according to claim 4, wherein the extraction section comprises:
a division section for dividing image data of the particular region which is a portion of image data of the captured frame image into a plurality of divided regions;
a sum value calculation section for calculating a sum of image data values for each divided region;
a divided region extraction section for extracting one of the divided regions of previous image data having a minimum difference in sum value between the previous image data and current image data, for each divided region of the current image data;
a left/right determination section for determining whether the divided region of the current image data which gives the minimum difference is located to the left or right of the extracted divided region of the previous image data; and
a movement vector information determination section for determining the movement vector information as left movement vector information when the divided region of the current image data is located to the left and as right movement vector information when the divided region of the current image data is located to the right.

11. A mobile body surrounding surveillance apparatus according to claim 5, wherein the detection section further comprises:
a movement vector number calculation section for detecting whether the movement vector information indicates "left" or "right" for each of all of the divided regions and incrementing a movement vector number when a specified one of "left" and "right" is indicated; and
an other mobile body approaching determination section for determining that there is the other mobile body approaching the mobile body when an incremented value of the movement vector number exceeds a determination threshold.

12. A mobile body surrounding surveillance apparatus according to claim 1, wherein:
the setting section sets a plurality of particular regions with respect to the image data captured by the image capturing section, the plurality of particular regions having the same position in a horizontal direction and different positions in a vertical direction;
the extraction section takes the image data of each particular region and extracts the movement vector information;
the detection section increments the vector number when the movement vector information of each divided region in the plurality of particular regions having the same position in the horizontal direction and the different positions in the vertical direction; and
when a total of the incremented values of all of the divided regions is greater than a predetermined determination threshold, it is determined that there is the other mobile body approaching the mobile body.

13. A mobile body surrounding surveillance method, comprising:
causing an image capturing section to capture image data of a surrounding of a mobile body in time series as frame images;
setting a landscape, band-like particular region parallel to the frame image every one or more of the captured frame images;
taking image data of the particular region every one or more of the captured frame images and extracting movement vector information based on the image data of the particular region; and
detecting another mobile body present in the surrounding of the mobile body based on the movement vector information.

14. A mobile body surrounding surveillance method according to claim 13, wherein the extraction step comprises:
taking image data of the set particular region which is a portion of the captured frame image;
dividing the particular region into a plurality of divided regions;
calculating a sum of image data values for each divided region;
storing the sum value of each divided region as current image data into a storage section;

reading the sum value data as previous image data from the storage section for each divided region time t before;

comparing the sum value of the current image data and the sum value of the previous image data and extracting one of the divided regions of the previous image data having a minimum difference in sum value between the previous image data and the current image data, for each divided region of the current image data;

determining whether the divided region of the current image data which gives the minimum difference is located to the left or right of the extracted divided region of the previous image data; and determining the movement vector information as left movement vector information when the divided region of the current image data is located to the left and as right movement vector information when the divided region of the current image data is located to the right.

15. A mobile body surrounding surveillance method according to claim 13, wherein the detection step further comprises:

detecting whether the movement vector information indicates "left" or "right" for each of all of the divided regions and incrementing a movement vector number when a specified one of "left" and "right" is indicated; and determining that there is the other mobile body approaching the mobile body when an incremented value of the movement vector number exceeds a determination threshold.

16. A computer-readable recording medium having recorded thereon a control program for causing a computer to execute a mobile body surrounding surveillance method according to claim 13.

* * * * *